P. GALASSI

Sept. 23, 1930. DIVIDING STRIP FOR TERRAZZO FLOORING Re. 17,815

Original Filed Jan. 18, 1928

Inventor

Pasquale Galassi

By his Attorney

Guido del Sacerdote

Reissued Sept. 23, 1930

Re. 17,815

UNITED STATES PATENT OFFICE

PASQUALE GALASSI, OF NEW YORK, N. Y.

DIVIDING STRIP FOR TERRAZZO FLOORINGS

Original No. 1,677,760, dated July 17, 1928, Serial No. 247,619, filed January 18, 1928. Application for reissue filed June 27, 1930. Serial No. 464,412.

This invention relates to improvements in the construction of terrazzo and similar floorings, and more particularly refers to a new type of dividing strip adapted for use in connection with such floors.

Terrazzo, granolithic, stucco and similar floors usually comprise a lower or foundation bed made of concrete or cement or mortar or other suitable material, and an upper or finishing layer generally consisting of a mixture of marble chips and cement, by means of which a good durable surface may be obtained as well as pleasing designs and color effects of a practically unlimited variety.

The upper layer which is generally placed in position after the foundation layer has been allowed to harden to a sufficient degree of consistency, is generally divided into a number of panels or units in a predetermined arrangement, which are obtained by outlining the desired design by means of dividing strips placed on or through the foundation layer.

These strips generally consist of flat metal bars set on edge having their upper edge flush with the surface of the floor; and said bars are generally provided with anchoring and positioning means insuring a firm binding action between the strips and the materials of which the floor is composed.

These bars are generally made of relatively soft metal such as brass for instance, the wearing qualities of which are approximately equal to those of the floor itself; and according to the nature of the floor and of the design to be produced, the dividing strips may be of various thicknesses and lengths.

Relatively thin strips may readily be obtained out of sheet metal, and are suitable for floors of moderate size; however, relatively large floors, or floors composed of relatively large units, call for strips having sufficient rigidity to withstand the lateral pressure of the material without bulging when the floor is laid.

These heavier strips are also generally made out of sheet metal but brass being expensive material, their use materially increases the cost of the floor. At times the ornamental features are such as to require extra thick metallic strips showing through the material, and in these cases, the cost is still higher.

Aside from their relatively high cost, heavy gauge strips also generally require more expensive operations and the use of heavier machines and dies for the production of anchoring and positioning means which are generally offset or otherwise obtained from the body of the strip itself.

In the case of extra heavy strips it becomes actually impossible to produce anchoring means by means of punch and die operations, and therefore suitable additions must be made to the strips by means of riveting or other equivalent operations, so that both the cost of material and that of labor are again materially increased.

The primary object of this invention is to provide a dividing strip for terrazzo floors and the like, of a novel and improved type, which can be made in various sections as may be desired and which may be produced so as to comprise a relatively thick upper portion and a relatively thin rib portion integral therewith, combining capacity to produce heavy lined designs with relative lightness and economy of metal.

Another object is to provide a novel and improved dividing strip for floors of the character specified adapted to be produced by rolling or drawing or extruding processes, comprising a relatively thick upper or head portion and a relatively thin rib portion, preferably provided with laterally extending positioning and supporting means.

A further object of the invention is to provide a dividing strip of the character specified, suitable for the production of relatively heavy lined designs, said strip comprising a relatively thin rib portion, readily lending itself to punch and die operations for the production of anchoring and positioning means, adapted to retain the device in position.

A still further object is to provide a novel type of dividing strip which is both light and rigid and relatively inexpensive to produce, affording new and numerous decorative possibilities for floors without entailing an excessive cost of production.

An additional object is to provide a dividing strip of the character specified adapted to be produced by rolling or drawing or extruding processes, comprising a relatively thick upper or head portion and a relatively thin rib portion, said rib portion being formed with a laterally extending supporting flange or flanges, adapted to anchor the strip in position and to insure its correct vertical alignment.

Still another object is to provide a novel and improved dividing strip for floors of the character specified, comprising a relatively thick upper or head portion and a relatively thin portion integral therewith, said rib portion being formed with a laterally extending flange or flanges acting as positioning and anchoring means for said strip.

Other objects and advantages of the present invention will more fully appear as the description proceeds and will be set forth and claimed in the appended claims.

Various embodiments of my invention are illustrated in the accompanying drawings, in which.

Figure 3:
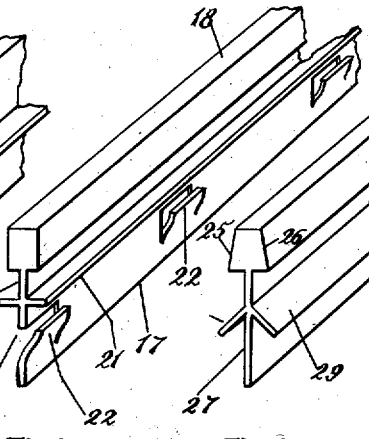
Figure 4:
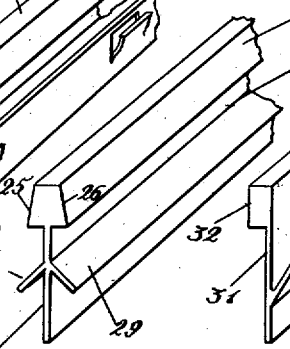
Figure 5:
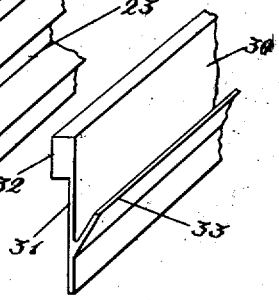
Figure 6:
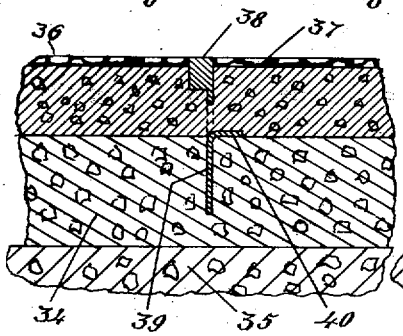
Figure 7:
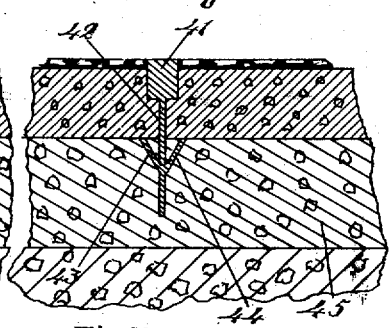

Figs. 3, 4, and 5 are similar views of strips of different designs also embodying my invention;

Fig. 6 is a vertical cross section showing another strip embodying my invention, in position, at the same time illustrating the function of positioning and anchoring means offset therefrom; and Fig. 7 is a vertical cross section showing another strip in position, said strip embodying my invention in a still different form.

Figure 1:
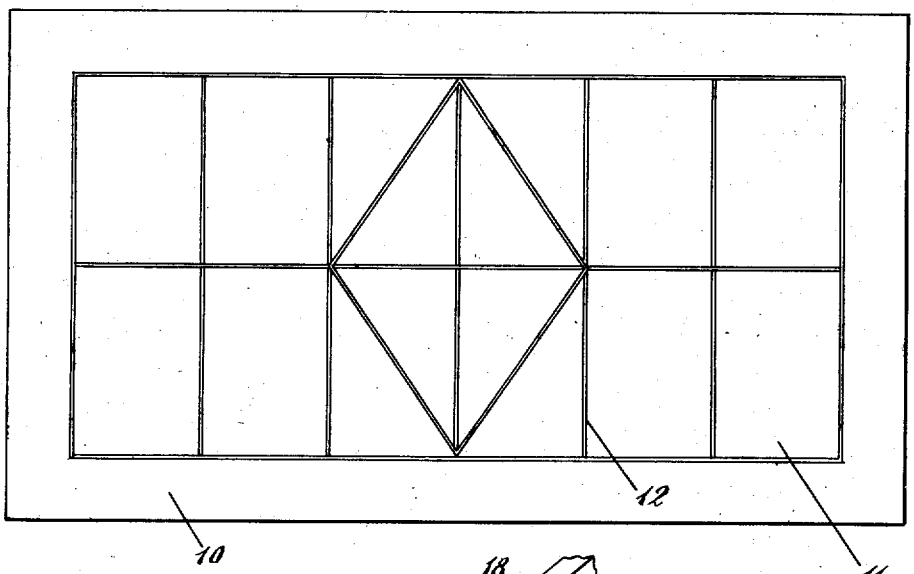
Fig. 1 is a plan view of a floor illustrating the manner in which the strips are used.

Referring to Fig. 1, it will be observed that the terrazzo floor 10 represented thereby is composed of a number of panels 11 delimited by dividing strips 12, set in a predetermined arrangement, defining the general design of the floor.

The type of strip to which this invention more particularly refers is especially intended for use in those instances where heavy lines are required for ornamental or constructional reasons. As stated before, if strips of the ordinary type are used, heavy lines defining the design entail the use of correspondingly heavy gauge metal for the strips.

Figure 2:
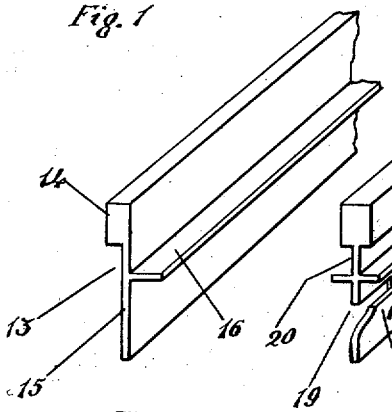
Fig. 2 is a fragmentary view in perspective of a strip embodying my invention in one of its possible forms.

In order to obviate the high cost entailed by such a procedure, as well as the limitations imposed by the use of heavy gauge metal on the production of suitable anchoring or/and positioning means for the strip, I have conceived the idea of producing a strip such as illustrated in Fig. 2 for instance, designated by numeral 13, comprising a relatively thick head or upper portion 14 and a relatively thin rib portion 15 integral with and depending therefrom, said rib portion being preferably formed with a laterally extending flange 16, the lower surface of which is at a distance from the upper edge of the strip, corresponding to the thickness of the upper or finishing layer of the floor.

A flange of this character has the object of limiting the depth at which the lower part of the rib portion may be inserted through the foundation bed of the floor, causing the upper edge of the strip to define the thickness of the upper layer.

Said flange therefore acts as a means for automatically gauging and leveling the upper layer of the floor and at the same time it also acts as a supporting means for the strip as a whole, maintaining it in a vertical position. Such a flange furthermore obviously strengthens the structure of the strip so that a more rigid section adapted to well stand all normal lateral stresses is obtained even if the metal is quite thin through the rib and flange section.

A floor strip of this character can be produced with comparative ease by well known rolling or drawing or extrusion processes, especially in view of the fact that the metal used is of a relatively soft texture. These processes of production are now widely used, so that the production of this type of strip does not entail the necessity of using specially designed machines, but only entails the necessity of producing rolls or dies of the proper shape, usable in connection with machines of standard type now found on the market.

By virtue of these conditions, my novel type of strip can be produced at relatively low cost for labor and at the same time, due to the nature of its design it results in important savings in the cost of material.

It will be observed that the style of strip illustrated can be produced together with its anchoring and positioning means in a single operation, while as a rule strips of ordinary design require separate operations for the production of the anchoring and positioning means.

It is obvious that the thickness of the head portion bears no relation to the thickness of the rib portion, so that while the supporting portion may have a relatively light section for all types of strips, the head portion may be made thicker or thinner as may be desired, so that without materially affecting the weight of the strip, the width of the upper edge may be produced between two widely different limits; therefore, numerous decorative possibilities are afforded by this feature within the range of relatively moderate costs of production.

My inventive idea may be embodied in strips having different sections, according to requirements. For instance, the strip 17 illustrated in Fig. 3 comprises a relatively thick head portion 18, and a relatively thin rib portion 19 integral with and centrally depending therefrom, said rib portion being formed with two side flanges 20, 21, acting as positioning and supporting means for the strip.

In addition to this, if desired, parts of the rib portion are also laterally offset therefrom at spaced intervals to form laterally and upwardly projecting lugs 22, more effectively insuring a safe anchorage of the strip in position. In view of the light weight of the rib portion, it is possible to produce said anchoring means by ordinary punch and die operations, while as stated, this could not easily be done if the strip was as thick as its head portion all through.

A still different type of strip is illustrated in Fig. 4 where 23 designates the strip comprising a head portion 24 having outwardly sloping sides 25, 26, and a rib portion 27 centrally depending therefrom. The rib portion is preferably formed with one or two laterally extending downwardly inclined flanges 28, 29.

The junction point between the flange or flanges and the rib portion corresponds to the upper surface of the foundation layer of the floor, and therefore the flange or flanges will become embedded in said foundation layer acting as supporting and positioning means and as effective anchoring means as well.

Furthermore, the sloping sides of the head portion will become wedged in position after the upper layer of the floor has become set and will assist the action of the anchoring means in preventing the possibility of the strip becoming loose in its setting.

Fig. 5 shows still another design of strip 30 in which the rib portion 31 is laterally depending from the head portion 32 and is provided with a laterally and upwardly extending flange 33, the upper edge of which is at a distance from the upper edge of the head portion equivalent to the thickness of the upper layer of the floor for the reasons previously stated.

In Fig. 6, 34 designates the lower layer or bed of the floor, laid on the floor foundation 35, 36 designates a strip embodying my invention in a still different form. Like in the previous cases, said strip comprises a relatively wide head portion 38 and a relatively thin rib portion 39, depending therefrom, the lower part of said rib portion being embedded into the lower layer of the floor to a depth where the upper edge of the strip is on a level with the upper surface of the finished floor.

As stated before, in order to facilitate the placing of the strips in position and in order to insure their vertical alignment, it is preferable to provide positioning and supporting means for the strip, and in this case, these are represented by lugs or ears such as 40, punched and bent off the rim portion of the strip to extend laterally therefrom at a point coinciding with the upper surface of the lower layer of the floor. These lugs or ears can be formed at spaced intervals and will effectively serve the purpose and functions of the flanges previously described.

This method of producing the supporting and positioning means to a certain extent weakens the section of the strip, so that a rigidity corresponding to that of the strips previously described could only in this case be obtained by increasing the thickness of the rib portion.

In Fig. 7 I illustrate another dividing strip having a still different outline, comprising a relatively wide head portion 41, a relatively thin rib portion 42, centrally depending therefrom, the lower part of which is embedded in the lower layer 45 of the floor, and two laterally and upwardly extending flanges 43, 44, the upper edges of which are on a level with the upper surface of the lower layer of the floor, as shown.

Numerous other sections of strips could be illustrated, all embodying my inventive idea, which consists substantially in producing a strip having all the decorative possibilities of heavy gauge metal without entailing its high costs.

The use of strips made according to my invention is advantageous also in many other respects; for instance, the freight and handling charges are lower than those entailed by ordinary strips of corresponding thickness, and furthermore the strips are easily set and retained in position due to their light weight and relative rigidity.

As stated, these strips are intended for use in connection with all kinds of terrazzo and like floors, and also on walls, stairs, and similar construction operations generally.

These structures especially floors and stairs are subject to considerable wear, therefore the upper section should reach within the floor to a material depth in order to insure permanency of the original design outlined thereby. The depth or height of said upper sections is therefore materially greater and at any rate never less than twice the thickness of the lower section, said depth or height being generally from $\frac{3}{16}''$ to $\frac{3}{8}''$ for ordinary use and more, if desired.

While in all the figures the flange or flanges are shown in a position where they can act as positioning means for the strips, it is obvious that other positioning means can be provided if desired, and that the flange or flanges can be made to laterally extend at any desired distance from the edges of the strip, without departing from the inventive idea.

The drawings are intended for illustrative purposes only, and not in a limiting sense, and I therefore reserve myself the right to carry my invention into practice in all those ways and manners which may enter, fairly, into the scope of the appended claims.

I claim:

1. A floor strip of the character described, comprising a relatively narrow rib portion and a wider head portion integral therewith, having an upper uninterrupted straight edge, said rib portion having an integral longitudinal flange laterally projecting therefrom.

2. A floor strip of the character described, comprising a relatively narrow rib portion and a wider head portion integral therewith, having an upper uninterrupted straight edge, said rib portion having an integral longitudinal flange laterally projecting therefrom, said flange acting as positioning means for said strip.

3. A floor strip of the character described, comprising a relatively narrow rib portion and a wider head portion integral therewith, having an upper uninterrupted straight edge, said rib portion having integral longitudinal flanges extending one at each side thereof.

4. A floor strip of the character described, comprising a relatively narrow rib portion and a wider head portion integral therewith, having an upper uninterrupted straight edge, said rib portion having integral longitudinal flanges extending one at each side thereof, at least one of said flanges acting as positioning means for said strip.

5. A floor strip of the character described, comprising a relatively narrow rib portion and a wider head portion integral therewith, having an upper uninterrupted straight edge, said rib portion having an integral longitudinal flange laterally projecting therefrom, and longitudinally spaced lugs laterally projecting from said rib portion.

6. A floor strip of the character described, comprising a relatively narrow rib portion and a wider head portion integral therewith, having an upper uninterrupted straight edge, said rib portion having an integral longitudinal flange laterally projecting therefrom, and longitudinally spaced lugs punched off and laterally offset from the body of said rib portion.

7. A floor strip of the character described, comprising a relatively narrow rib portion and wider head portion integral therewith, having an upper uninterrupted straight edge, said rib portion having integral longitudinal flanges extending one at each side thereof, at least one of said flanges acting as positioning means for said strip, and longitudinally spaced lugs laterally projecting from said rib portion.

8. A floor of the character described, comprising a plurality of sections and dividing strips therebetween, said strips comprising a body portion and a longitudinal flange integral with and extending laterally of said body portion, said flange forming a solid section with said body portion.

9. A floor of the character described, comprising a plurality of sections and dividing strips therebetween, said strips comprising a body portion and a longitudinal flange integral with and extending laterally of said body portion, said flange forming a solid section with said body portion, and acting as positioning means for said strip.

10. A floor of the character described, comprising a plurality of sections and dividing strips therebetween, said strips comprising a body portion and a longitudinal flange integral with and extending laterally of said body portion, said flange forming a solid section with said body portion, the upper part of said body portion being thicker than the lower part thereof.

11. A floor of the character described, comprising a plurality of sections and dividing strips therebetween, said strips comprising a body portion and a longitudinal flange integral with and extending laterally of said body portion, said flange forming a solid section with said body portion, and acting as positioning means for said strip, the upper part of said body portion being thicker than the lower part thereof.

PASQUALE GALASSI.